US006956368B2

(12) United States Patent
Johnson et al.

(10) Patent No.: US 6,956,368 B2
(45) Date of Patent: *Oct. 18, 2005

(54) MAGNETIC ROTATIONAL POSITION SENSOR

(75) Inventors: Gary W. Johnson, Huntington, IN (US); Robert H. Luetzow, Highland Village, TX (US)

(73) Assignee: Wabash Technologies, Inc., Huntington, IN (US)

(*) Notice: Subject to any disclaimer, the term of this patent is extended or adjusted under 35 U.S.C. 154(b) by 69 days.

This patent is subject to a terminal disclaimer.

(21) Appl. No.: 10/348,234

(22) Filed: Jan. 21, 2003

(65) Prior Publication Data

US 2003/0132745 A1 Jul. 17, 2003

Related U.S. Application Data

(63) Continuation-in-part of application No. 09/645,190, filed on Aug. 24, 2000, now Pat. No. 6,509,734, which is a continuation of application No. 09/074,946, filed on May 8, 1998, now Pat. No. 6,137,288.

(51) Int. Cl.[7] .................................................. G01B 7/30

(52) U.S. Cl. .............................. 324/207.25; 324/207.22

(58) Field of Search ......................... 324/207.2, 207.22, 324/207.25, 207.21, 207.15, 16, 173–174, 252; 123/406.52, 617; 327/510–511; 338/32 R, 32 H

(56) References Cited

U.S. PATENT DOCUMENTS

| | | | | |
|---|---|---|---|---|
| 4,810,965 A | | 3/1989 | Fujiwara et al. | 324/208 |
| 5,270,645 A | * | 12/1993 | Wheeler et al. | 324/207.12 |
| 5,332,965 A | | 7/1994 | Wolf et al. | 324/207.12 |
| 5,444,369 A | | 8/1995 | Luetzow | 324/207.2 |
| 5,460,035 A | | 10/1995 | Pfaffenberger | 73/118.1 |
| 5,497,081 A | | 3/1996 | Wolf et al. | 324/207.12 |
| 5,504,427 A | | 4/1996 | Cooper et al. | 324/207.17 |
| 5,506,502 A | | 4/1996 | Maennle | 324/207.25 |
| 5,512,820 A | | 4/1996 | Alfors | 324/207.22 |
| 5,521,495 A | | 5/1996 | Takahashi et al. | 324/207.18 |
| 5,544,000 A | | 8/1996 | Suzuki et al. | 361/139 |
| 5,572,120 A | | 11/1996 | Takaishi et al. | 324/207.21 |
| 5,578,962 A | | 11/1996 | Rastegar | 330/9 |
| 5,600,238 A | | 2/1997 | Holloway et al. | 324/207.21 |
| 5,602,471 A | | 2/1997 | Muth et al. | 324/207.21 |
| 5,611,548 A | | 3/1997 | Dahlhaus | 277/152 |
| 5,621,179 A | | 4/1997 | Alexander | 73/862.331 |
| 5,625,239 A | | 4/1997 | Persson et al. | 310/68 |
| 5,625,289 A | | 4/1997 | Daetz et al. | 324/207.14 |
| 5,627,465 A | | 5/1997 | Alfors et al. | 324/207.2 |
| 5,698,778 A | | 12/1997 | Ban et al. | 73/118.1 |
| 5,712,561 A | | 1/1998 | McCurley et al. | 324/207.2 |
| 6,404,185 B1 | * | 6/2002 | Allwine | 324/207.2 |

* cited by examiner

*Primary Examiner*—Bot Ledynh
*Assistant Examiner*—Reena Aurora
(74) *Attorney, Agent, or Firm*—Krieg DeVault LLP

(57) ABSTRACT

A magnetic rotational position sensor comprising a magnetic circuit including a loop pole piece and a magnet, and a magnetic flux sensor adapted to sense varying magnitudes of magnetic flux density associated with the magnetic circuit. The loop pole piece has a peripheral outer wall defining an inner air gap, with the outer wall including an inwardly projecting portion extending into the air gap. The magnet is positioned within the air gap generally opposite the inwardly projecting portion of the loop pole piece. The magnet and the loop pole piece cooperate to generate a magnetic field within the air gap. The magnetic circuit is rotatable about a rotational axis to correspondingly rotate the magnetic field about the rotational axis. The magnetic flux sensor is disposed within the magnetic field to sense a different magnitude of magnetic flux density in response to rotation of the magnetic field about the rotational axis.

23 Claims, 15 Drawing Sheets

MAGNETIC ROTATIONAL POSITION SENSOR

CROSS REFERENCE TO RELATED APPLICATIONS

This application is a continuation-in-part of patent application Ser. No. 09/645,190, filed Aug. 24, 2000, now U.S. Pat. No. 6,509,734 which is a continuation of patent application Ser. No. 09/074,946, filed May 8, 1998 and issued on Oct. 24, 2002 as U.S. Pat. No. 6,137,288, the contents of each patent application hereby being incorporated by reference.

BACKGROUND OF THE INVENTION

The present invention generally relates to the field of rotational position sensors, and more specifically to a magnetic rotational position sensor for sensing the rotational position of a control shaft about a rotational axis over a definable range of rotation.

Electronic fuel injected engines used in motor vehicles typically embody a microprocessor based control system. Fuel is metered or injector activation time is varied in accordance with various engine parameters including the regulation of air flow into the engine via a rotational position of a throttle diaphragm relative to a closed position of the throttle diaphragm. Typically, a shaft is adjoined to the throttle diaphragm to synchronously rotate the throttle diaphragm as the shaft is rotated between the closed position and a maximal open position of the throttle diaphragm. Rotational position sensors are adjoined to the shaft to sense each rotational position of the shaft, i.e. each degree of rotation of the shaft relative to the closed position, whereby the rotational position of the throttle diaphragm relative to the closed position is sensed.

One of the problems associated with the prior magnetic rotational position sensors is magnetic hysteresis. Magnetic hysteresis causes an offset error signal to be generated whenever a magnetic element of the sensor, e.g. a magnetic pole piece or a magnetic rotor, is advanced from and returned to a reference position of the magnetic element. Annealing the magnetic element can minimize, but never eliminate, magnetic hysteresis. What is therefore needed is a novel and unique.

Thus, there is a general need in the industry to provide an improved magnetic rotational position sensor. The present invention meets this need and provides other benefits and advantages in a novel and unobvious manner.

SUMMARY OF THE INVENTION

The present invention relates generally to magnetic rotational position sensors. While the actual nature of the invention covered herein can only be determined with reference to the claims appended hereto, certain forms of the invention that are characteristic of the preferred embodiments disclosed herein are described briefly as follows.

In one form of the present invention, a magnetic rotational position sensor is provided, comprising a magnetic circuit including a loop pole piece and a magnet. The loop pole piece has a peripheral outer wall defining an inner air gap, with the outer wall including an inwardly projecting portion extending into the air gap. The magnet is positioned within the air gap and disposed generally opposite the inwardly projecting portion of the loop pole piece. The magnet and the loop pole piece cooperate to generate a magnetic field within the air gap. The magnetic circuit is rotatable about a rotational axis to correspondingly rotate the magnetic field about the rotational axis. A magnetic flux sensor is disposed within the magnetic field to sense a different magnitude of magnetic flux density in response to rotation of the magnetic field about the rotational axis.

In another form of the present invention, a magnetic rotational position sensor is provided, comprising a magnetic circuit including a loop pole piece and a magnet. The loop pole piece has a peripheral outer wall defining an inner air gap. The outer wall includes a pair of outwardly projecting arcuate portions arranged on opposite sides of a central axis and defining concave inner surfaces, and an inwardly projecting arcuate portion arranged generally along the central axis and defining a convex inner surface. The magnet is positioned within the air gap generally opposite the inwardly projecting portion of the loop pole piece. The loop pole piece and the magnet cooperate to generate a magnetic field within the air gap. The magnetic circuit is rotatable about a rotational axis to correspondingly rotate the magnetic field about the rotational axis. A magnetic flux sensor is disposed within the magnetic field to sense a different magnitude of magnetic flux density in response to rotation of the magnetic field about the rotational axis.

In a further form of the present invention, a magnetic rotational position sensor is provided, comprising a magnetic circuit including a loop pole piece defining an inner air gap and a magnet disposed within the air gap. The loop pole piece and the magnet cooperate to generate a magnetic field. The magnetic circuit is rotatable about a rotational axis to correspondingly rotate the magnetic field about the rotational axis. A magnetic flux sensor extending along a sensor axis is provided to sense a magnitude of magnetic flux density passing therethrough. The magnetic flux sensor is disposed within the magnetic field with the central axis offset from and arranged substantially parallel to the rotational axis to sense a different magnitude of magnetic flux density in response to rotation of the magnetic field about the rotational axis.

It is one object of the present invention to provide an improved magnetic rotational position sensor. Further objects, features, advantages, benefits, and further aspects of the present invention will become apparent from the drawings and description contained herein.

DESCRIPTION OF THE PREFERRED EMBODIMENT

Figure 1A:
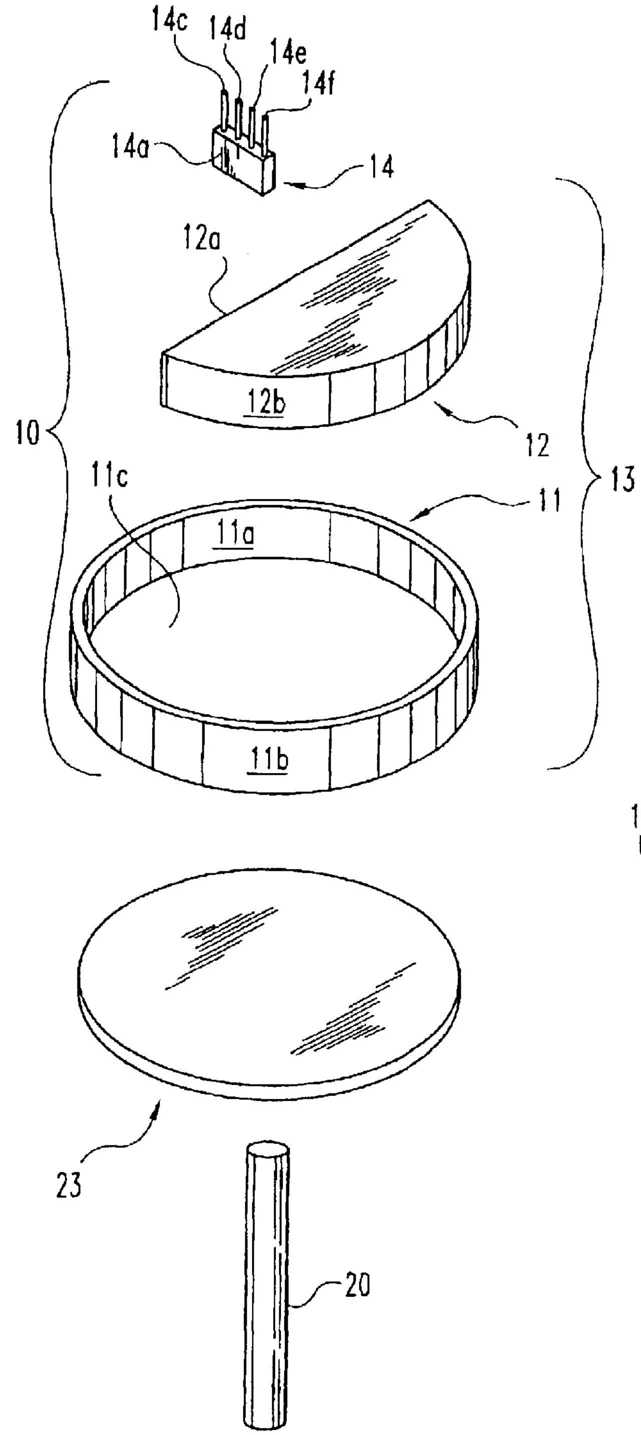
FIG. 1A is a first exploded view of a first embodiment of a magnetic rotational position sensor according to one form of the present invention.

For the purposes of promoting an understanding of the principles of the invention, reference will now be made to the embodiments illustrated in the drawings and specific language will be used to describe the same. It will nevertheless be understood that no limitation of the scope of the invention is hereby intended, such alterations and further modifications in the illustrated devices, and such further applications of the principles of the invention as illustrated herein being contemplated as would normally occur to one skilled in the art to which the invention relates.

The present invention is a novel and unique magnetic rotational position sensor that senses each degree of rotation of a control shaft about a rotational axis over a definable range of rotation without experiencing magnetic hysteresis. For purposes of the present invention, a control shaft is broadly defined as any article of manufacture or any combination of manufactured articles that is adjoined to an object, e.g. a throttle diaphragm, a foot pedal, a piston, etc., to control the linear, angular and/or rotational movement of the object as the control shaft is rotated about a rotational axis, e.g. a longitudinal axis of the control shaft. Referring to FIGS. 1A–1D, a first embodiment of a magnetic rotational position sensor 10 in accordance with the present invention is shown. Magnetic rotational position sensor 10 senses each degree of rotation of a control shaft 20 about a rotational axis over a 180 degree range of rotation without experiencing magnetic hysteresis as further described in FIGS. 2A–2C and accompanying text.

Magnetic rotational position sensor 10 comprises a loop pole piece. For purposes of the present invention, a loop pole piece is broadly defined as any magnetizable article of manufacture or any combination of manufactured magnetizable articles that has a closed configuration defining an air gap area. The present invention contemplates that the loop pole piece can vary in geometric size and shape, and can be made from any magnetizable material. Preferably, the loop pole piece is a soft magnetic steel loop pole piece 11 having an annular inner diameter surface 11*a* defining an air gap area 11*c* and an annular outer diameter surface 11*b* as shown in FIGS. 1A–1D. It is also preferred that loop pole piece 11 has a thickness of 0.1 inches, inner diameter surface 11*a* has a radius of 0.7 inches, and outer diameter surface 11*b* has a radius of 0.75 inches.

Figure 1B:
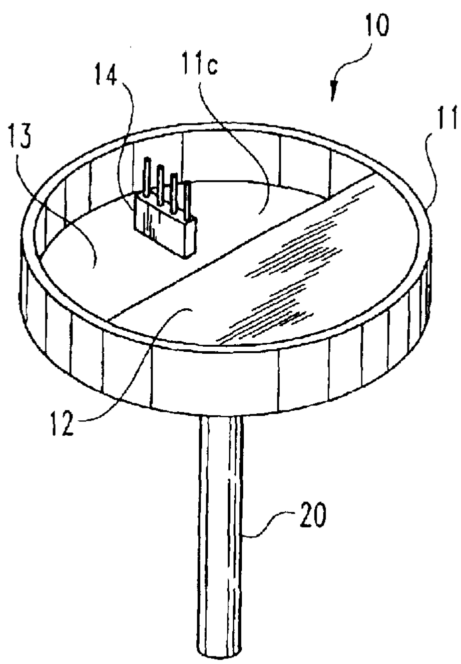
FIG. 1B is a first perspective view of the magnetic rotational position sensor of FIG. 1A, as assembled and adjoined to a control shaft.
Figure 1C:
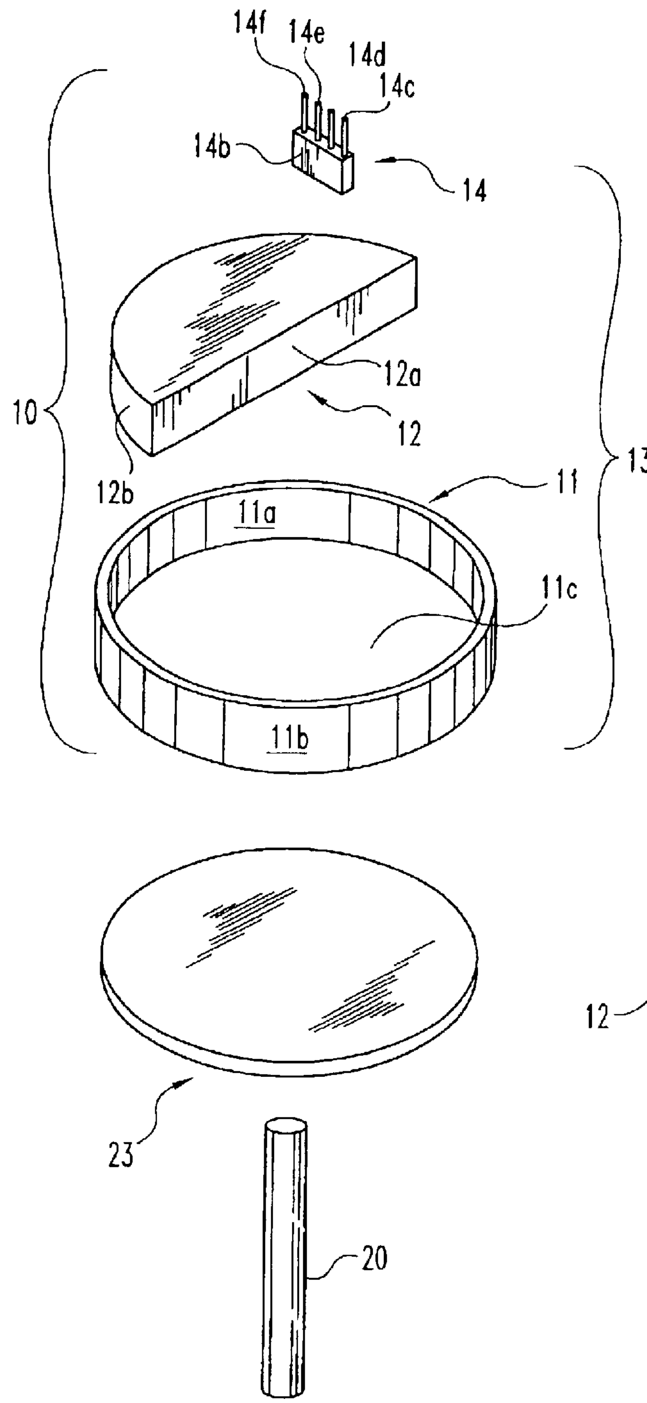
FIG. 1C is a second exploded view of the magnetic rotational position sensor of FIG. 1A.
Figure 1D:
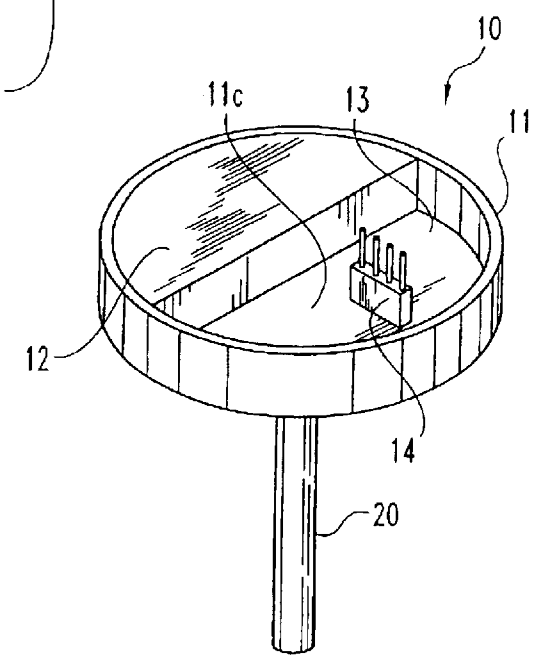
FIG. 1D is a second perspective view of the magnetic rotational position sensor of FIG. 1A, as assembled and adjoined to a control shaft.

Magnetic rotational position sensor 10 further comprises a magnet disposed within air gap area 11*c* to constitute a magnetic circuit that generates a magnetic field within air gap area 11*c* and encloses the magnetic field within loop pole piece 11 to prevent magnetic hysteresis. Accordingly, the present invention contemplates that either a north pole surface of the magnet is facing and spaced from inner diameter surface 11*a* and a south pole surface of the magnet is facing and adjacent inner diameter surface 11*a*, or a north pole surface of the magnet is facing and adjacent inner diameter surface 11*a* and a south pole surface of the magnet is facing and spaced from inner diameter surface 11*a*, or a north pole surface and a south pole surface of the magnet are both facing and spaced from inner diameter surface 11*a*. The present invention further contemplates that the magnet can vary in geometric size and shape, and can be any type of magnet. Preferably, the magnet is an injection molded rare earth magnet 12 having a substantially semi-circular configuration that is void of any magnetic flux density "hot spots" along both pole surfaces. Magnet 12 is disposed within air gap area 11*c* to constitute a magnetic circuit 13 as shown in FIGS. 1B and 1D. Magnet 12 has a north pole surface 12*a* facing and spaced from inner diameter surface 11*a* and a south pole surface 12*b* facing and adjoined to inner diameter surface 11*a* to generate an equally balanced magnetic field 15 throughout air gap area 11*c* and to enclose magnetic field 15 within loop pole piece 11 as further described in FIGS. 2A–2C and accompanying text. It is also preferred that magnet 12 has a thickness of 0.1 inches, and a maximum radial length of south pole surface 12*b* is 0.25 inches. Loop pole piece 11 is adjoined to control shaft 20 to synchronously rotate magnetic field 15 about a second rotational axis for each degree of rotation of control shaft 20 about a first rotational axis, e.g. longitudinal axis 21 of control shaft 20, as further described in FIGS. 2A–2C and accompanying text. For purposes of the present invention, the term adjoined is broadly defined as an unitary fabrication, a permanent affixation, a detachable coupling, a continuous engagement or a contiguous disposal by any means of a first article and a second article, e.g. south pole surface 12*b* and inner diameter surface 11*a*, and loop pole piece 11 and control shaft 20. Preferably, loop pole piece 11, magnet 12 and control shaft 20 are encapsulated in plastic to permanently affix south pole surface 12*a* and inner diameter surface 11*a* via a plastic bonding, and to permanently affix loop pole piece 11 and control shaft 20 via a plastic base 23 as shown in FIGS. 1A–1D.

Magnetic rotational position sensor 10 further comprises a magnetic flux sensor. For purposes of the present invention, a magnetic flux sensor is broadly defined as any device operable to sense a magnitude of a magnetic flux density passing through the device and operable to generate at least one voltage sensing signal representative of a magnitude of magnetic flux density passing through the device. Preferably, the magnetic flux sensor is a Hall effect device 14, e.g. a HZ-302C(SIP type) Hall effect device manufactured by Ashai Kasei Electronics Co., Ltd., as shown in FIGS. 1A–1D. Hall effect device 14 has a first plane 14*a* and a second plane 14*b*, and is operable to sense a magnitude of magnetic flux density passing through planes 14*a* and 14*b*. Hall effect device includes an input lead 14*c*, a reference lead 14*d*, a first output lead 14*e* and a second output lead 14*f*. In response to a current drive signal $I_{DS}$ and a voltage drive signal $V_{DS}$, Hall effect device 14 is also operable to generate a first voltage sensing signal $V_{SS1}$ and a second voltage sensing signal $V_{SS2}$. Both voltage sensing signals $V_{SS1}$ and $V_{SS2}$ are representative of a magnitude of magnetic flux density passing through planes 14*a* and 14*b*, respectively, as further described in FIGS. 4A and 4B, and accompanying text.

Figure 2A:
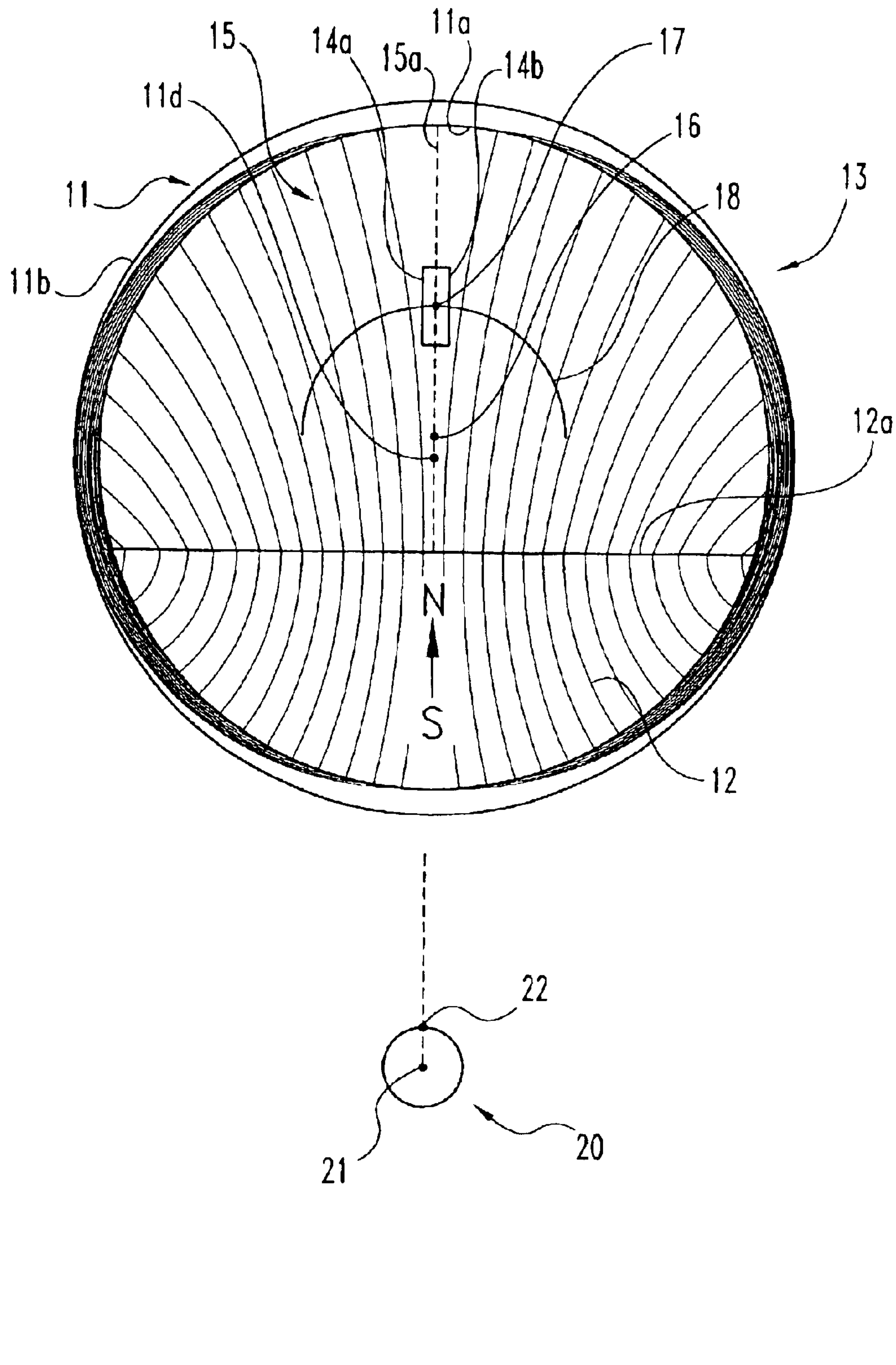
FIG. 2A is a first diagrammatic illustration of a magnetic circuit of FIGS. 1A–1D.
Figure 2B:
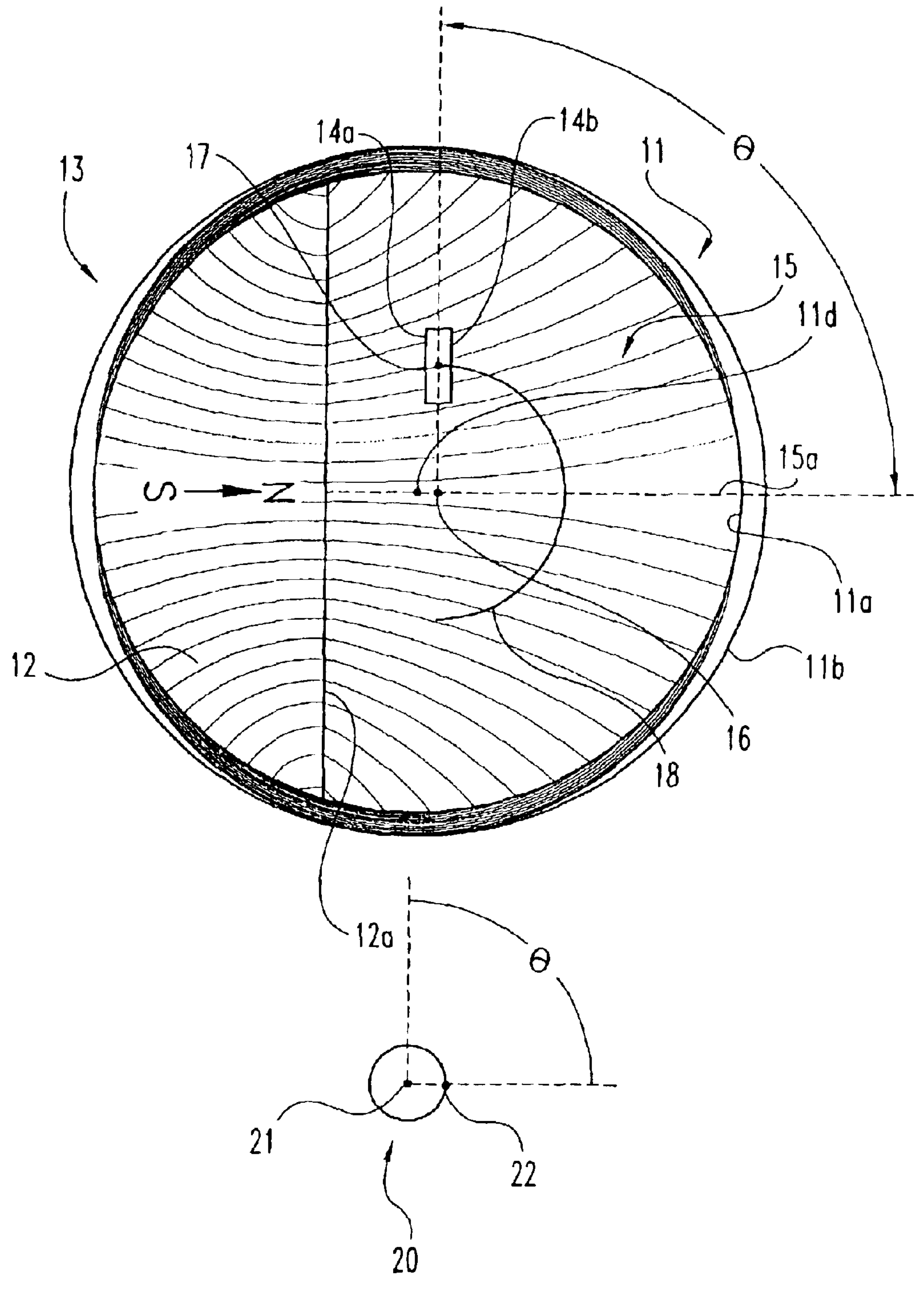
FIG. 2B is a second diagrammatic illustration of the magnetic circuit of FIGS. 1A–1D.
Figure 2C:
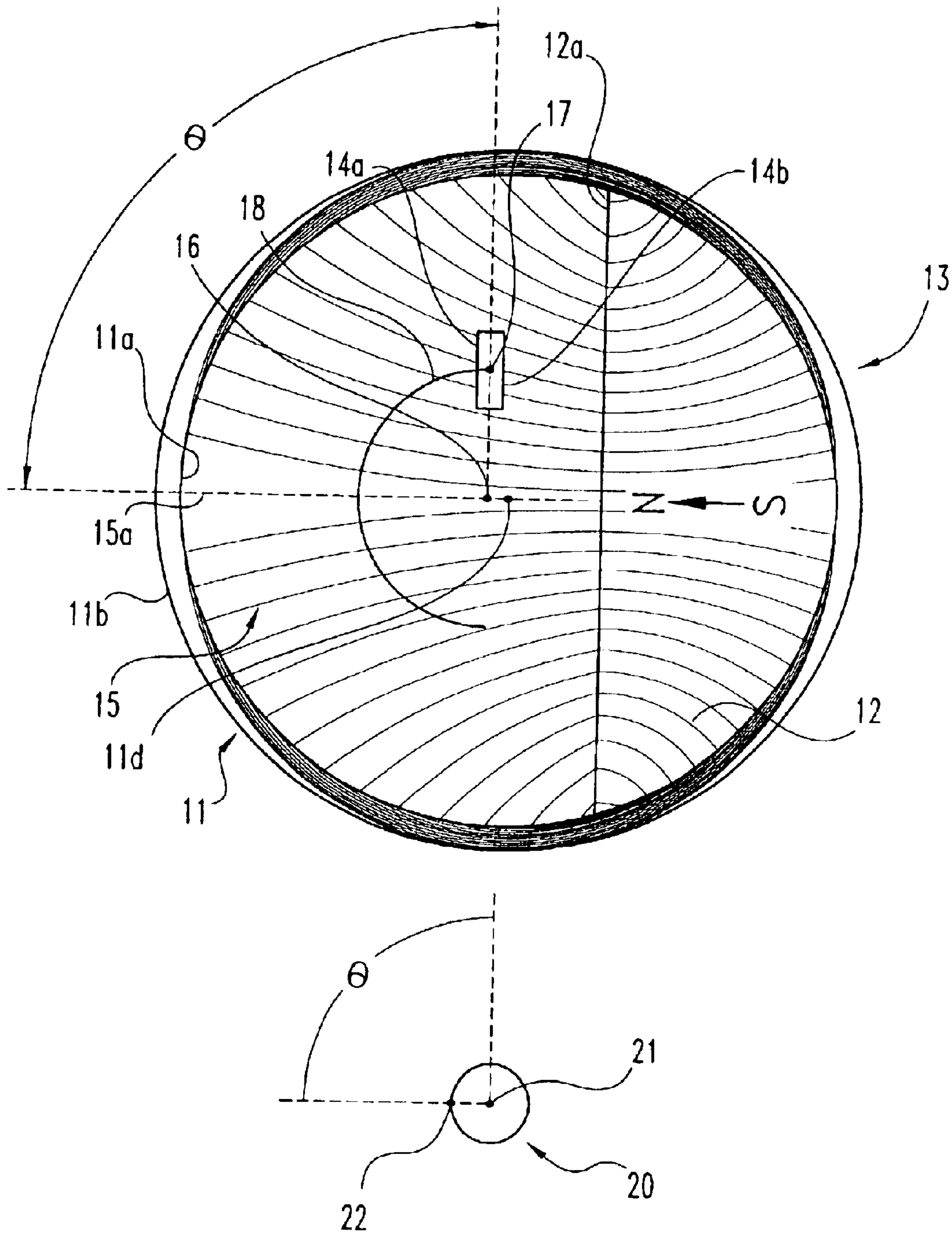
FIG. 2C is a third diagrammatic illustration of the magnetic circuit of FIGS. 1A–1D.

Referring to FIGS. 2A–2C, to sense each degree of rotation of control shaft 20 about a rotational axis, e.g. a longitudinal axis 21 of control shaft 20, over a definable range of rotation, a different magnitude of magnetic flux density must pass through planes 14*a* and 14*b* of magnetic flux sensor 14 for each degree of synchronized rotation of magnetic field 15 about a second rotational axis, e.g. a rotational axis 16, over the definable range of rotation. Consequently, an angular orientation angle θ of planes 14*a* and 14*b* relative to magnetic field 15 must change for each degree of synchronized rotation of magnetic field 15 about rotational axis 16 over the definable range of rotation. Preferably, when magnetic flux sensor 14 is disposed along a center line 15*a* of magnetic field 15, planes 14*a* and 14*b* are parallel to magnetic field 15, i.e. an angular orientation angle θ of zero degrees, as shown in FIG. 2A. It is to be appreciated and understood that angular orientation angle θ relative to magnetic field 15 will change with each degree of synchronized rotation of magnetic field 15 about rotational axis 16 over a ±ninety (90) degree range of synchronized rotation of magnetic field 15 relative to magnetic flux sensor 14 as evidenced by the synchronized rotational movement of a center point 17 of magnetic flux sensor 14 and a reference point 22 of control shaft 20 as shown in FIGS. 2B and 2C. Thus, it is to be appreciated and understood that each degree of rotation of control shaft 20 about longitudinal axis 21 over a 180 degree range of rotation can be sensed because each degree of rotation of control shaft 20 about longitudinal axis 21 exclusively corresponds to a distinct degree of synchronized rotation of magnetic field 15 about rotational axis 16 and a different magnitude of magnetic flux density will pass through magnetic flux sensor 14 for each degree of synchronized rotation of magnetic field 15 about rotational axis 16 over the 180 degree range of rotation.

To linearly sense each degree of rotation of control shaft 20 about longitudinal axis 21 over the 180 degree range of rotation, angular orientation angle θ must uniformly change for each degree of synchronized rotation of magnetic field 15 about rotational axis 16. One aspect of the present invention is that for a selected rotational axis of magnetic field 15 that intersects center line 15*a*, angular orientation angle θ uniformly changes along one radial arc originating from the selected rotational axis for each degree of synchronized rotation of magnetic field 15 about the selected rotational axis over approximately an ±eighty (80) degree range of synchronized rotation of magnetic field 15. For example, angular orientation angle θ uniformly changes along a radial arc 18 originating from rotational axis 16 for each degree of synchronized rotation of magnetic field 15 about rotational axis 16 over approximately an ±eighty (80) degree range of synchronized rotation of magnetic field 15 relative to magnetic flux sensor 14. Thus, it is preferred that magnetic flux sensor is initially disposed within magnetic field 15 along center line 15*a* of magnetic field 15 with planes 14*a* and 14*b* parallel to magnetic field 15 and center point 17 of magnetic flux sensor 14 being an intersection point of center line 15*a* of magnetic field 15 and radial arc 18.

Referring still to FIGS. 2A–2C, several important points must be appreciated and understood. First, the present invention contemplates that the rotational axis of control shaft 20 may or may not coincide with a selected rotational axis of a generated and enclosed magnetic field. Preferably, the rotational axis of control shaft 20 does coincide with the selected rotational axis of the magnetic field, e.g. longitudinal axis 21 of shaft 20 coinciding with rotational axis 16 of magnetic field 15. Second, the relative dimensions of an inner diameter surface of a loop pole piece in accordance with the present invention and a north pole surface and a south pole surface of a magnet in accordance with the present invention defines the maximum synchronous range of rotation of a generated and enclosed magnetic field relative to a magnetic flux sensor. For example, inner diameter surface 11*a* of loop pole piece 11, and poles surfaces 12*a* and 12*b* enable magnetic field 15 to be rotated at least 180 degrees relative to magnetic flux sensor 14. Finally, the symmetrical configurations of a loop pole piece and a magnet void of magnetic flux density "hot spots" along both pole surfaces relative to a center line of a generated and enclosed magnetic field equally balances the magnetic field throughout the air gap area. For example, the symmetrical configurations of loop pole piece 11 and magnet 12 relative to center line 15*a* of magnetic field 15 equally balances magnetic field 15 throughout air gap area 11*c*.

Figure 3A:
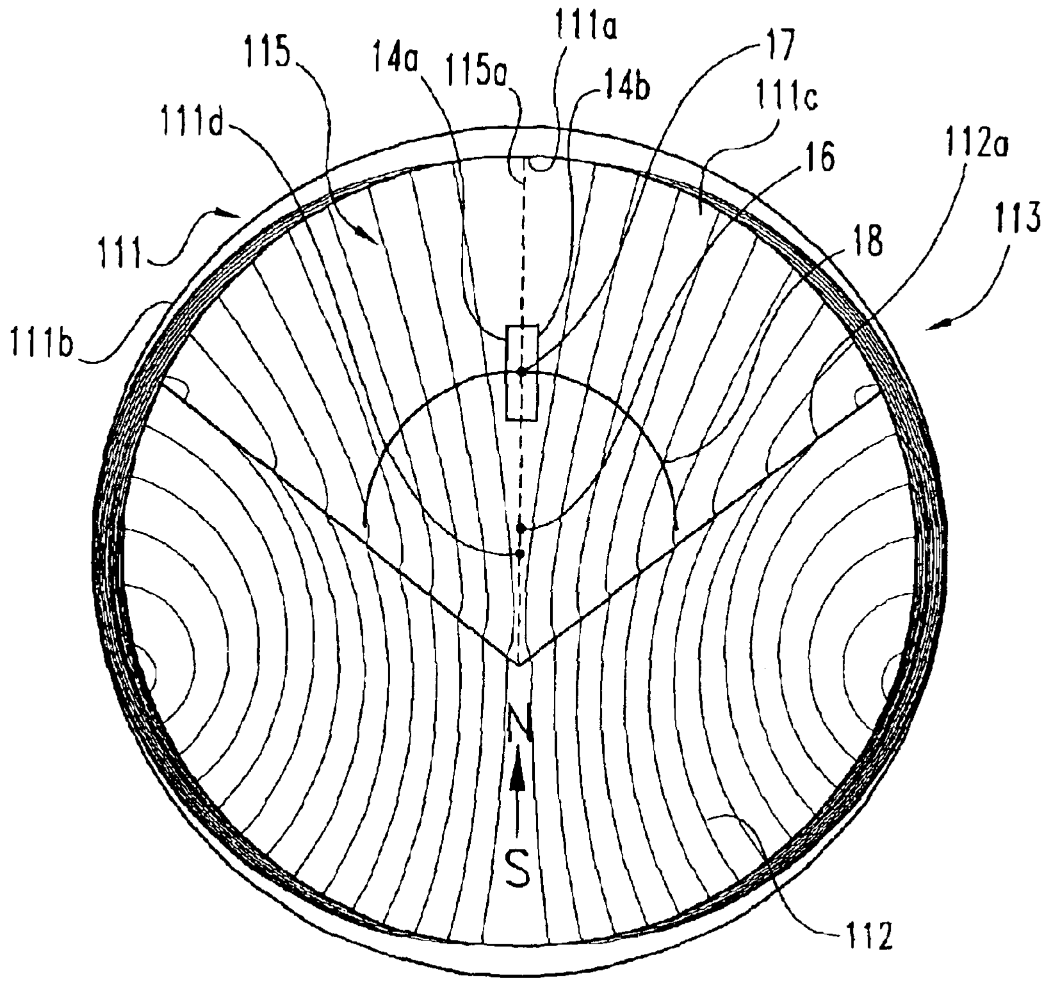
FIG. 3A is a diagrammatic illustration of a second embodiment of a magnetic circuit in accordance with the present invention.
Figure 3B:
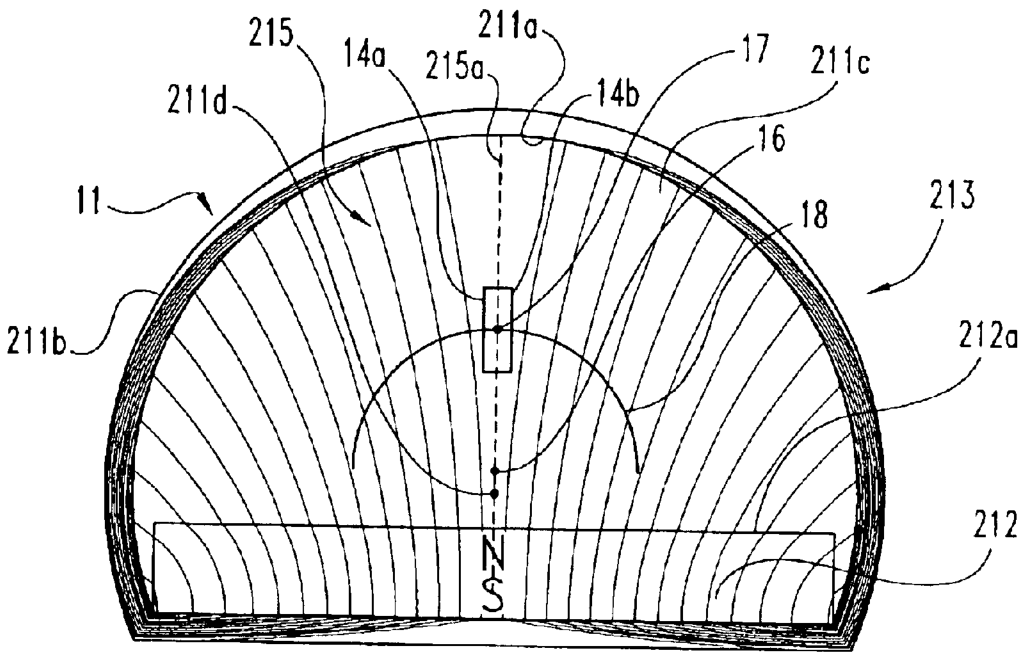
FIG. 3B is a diagrammatic illustration of a third embodiment of a magnetic circuit in accordance with the present invention.
Figure 3C:
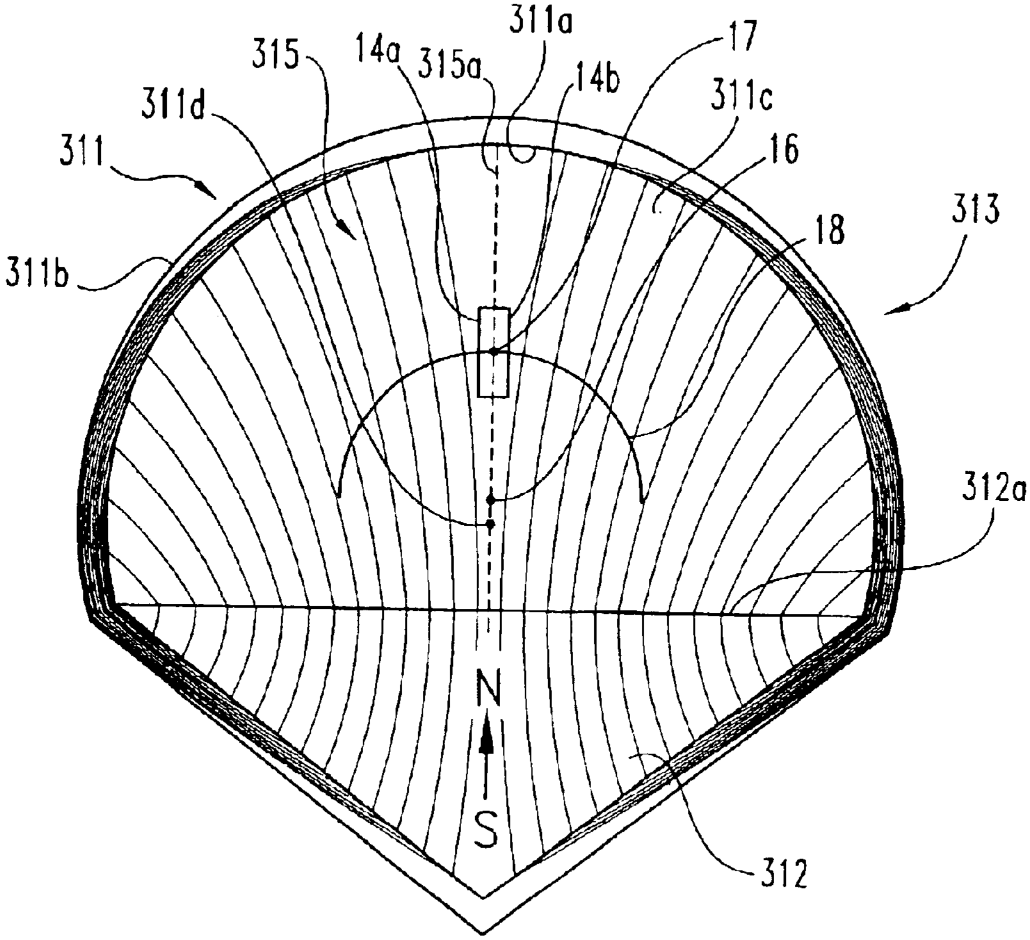
FIG. 3C is a diagrammatic illustration of a fourth embodiment of a magnetic circuit in accordance with the present invention.

Referring to FIGS. 3A–3C, some examples of other magnetic circuits in accordance with the present invention having symmetrical configurations of a loop pole piece and of a magnet void of magnetic flux density "hot spots" along both pole surfaces relative to a centerline of a magnetic field are shown. Referring to FIG. 3A, a second embodiment of a magnetic circuit 113 includes a loop pole piece 111 having an annular configuration and a magnet 112 having a three quarter configuration. Loop pole piece 111 has an annular inner diameter surface 111*a* defining an air gap area 111*c*. Magnet 112 is disposed within air gap area 111*c* and has a north pole surface 112*a* facing and spaced from inner diameter surface 111*a* and a south pole surface 112*b* adjoined to inner diameter surface 111*a* to generate and enclose an equally balanced magnetic field 115 throughout air gap area 111*c*. Magnetic circuit 113 is advantageous to provide a more concentrated magnetic field 115 in situations where the definable range of rotation of control shaft 20 is to be thirty (30) degrees. Referring to FIG. 3B, a third embodiment of a magnetic circuit 213 includes a loop pole piece 211 having a dome configuration and a magnet 212 having a rectangular prism configuration. Loop pole piece 211 has an inner diameter surface 211*a* defining an air gap area 211*c*. Magnet 212 is disposed within air gap area 211*c* and has a north pole surface 212*a* facing and spaced from inner diameter surface 211*a* and a south pole surface 212*b* adjoined to inner diameter surface 211*a* to generate and enclose an equally balanced magnet field 215 throughout air gap area 211*c*. Magnetic circuit 213 is advantageous in situations where the simplicity of manufacturing a magnet or the expense in purchasing a magnet is of primary importance. Referring to FIG. 3C, a fourth embodiment of a magnetic circuit 313 includes a loop pole piece 311 having a diamond configuration and a magnet 312 having a triangular prism configuration. Loop pole piece 311 has an inner diameter surface 311*a* defining an air gap area 311*c*. Magnet 312 is disposed within air gap area 311*c* and has a north pole surface 312*a* facing and spaced from inner diameter surface 311*a* and a south pole surface 312*b* adjoined to inner diameter surface 311*a* to generate and enclose an equally balanced magnet field 315 throughout air gap area 311*c*.

As previously described in FIGS. 1A–1D and accompanying text, a current drive signal $I_{DS}$ and a voltage drive signal $V_{DS}$ need to be supplied to Hall effect device 14 to generate voltage sensing signals $V_{SS1}$ and $V_{SS2}$. The present invention contemplates that any power source supplying current drive signal $I_{DS}$ and voltage drive signal $V_{DS}$ to Hall effect device 14 via input lead 14*a* may be exposed to adverse temperatures as low as −40° Celsius to as high as 150° Celsius when Hall effect device 14 is located in a engine compartment of a motor vehicle, and consequently, it is to be appreciated and understood that current drive signal $I_{DS}$ and voltage drive signal $V_{DS}$ can significantly fluctuate under such adverse temperature conditions. Accordingly, a preferred embodiment of a drive circuit 30 to invariably generate a constant current drive signal $I_{CDS}$ and a constant voltage drive signal $V_{CDS}$ over such adverse temperatures is shown in FIG. 4A.

Figure 4A:
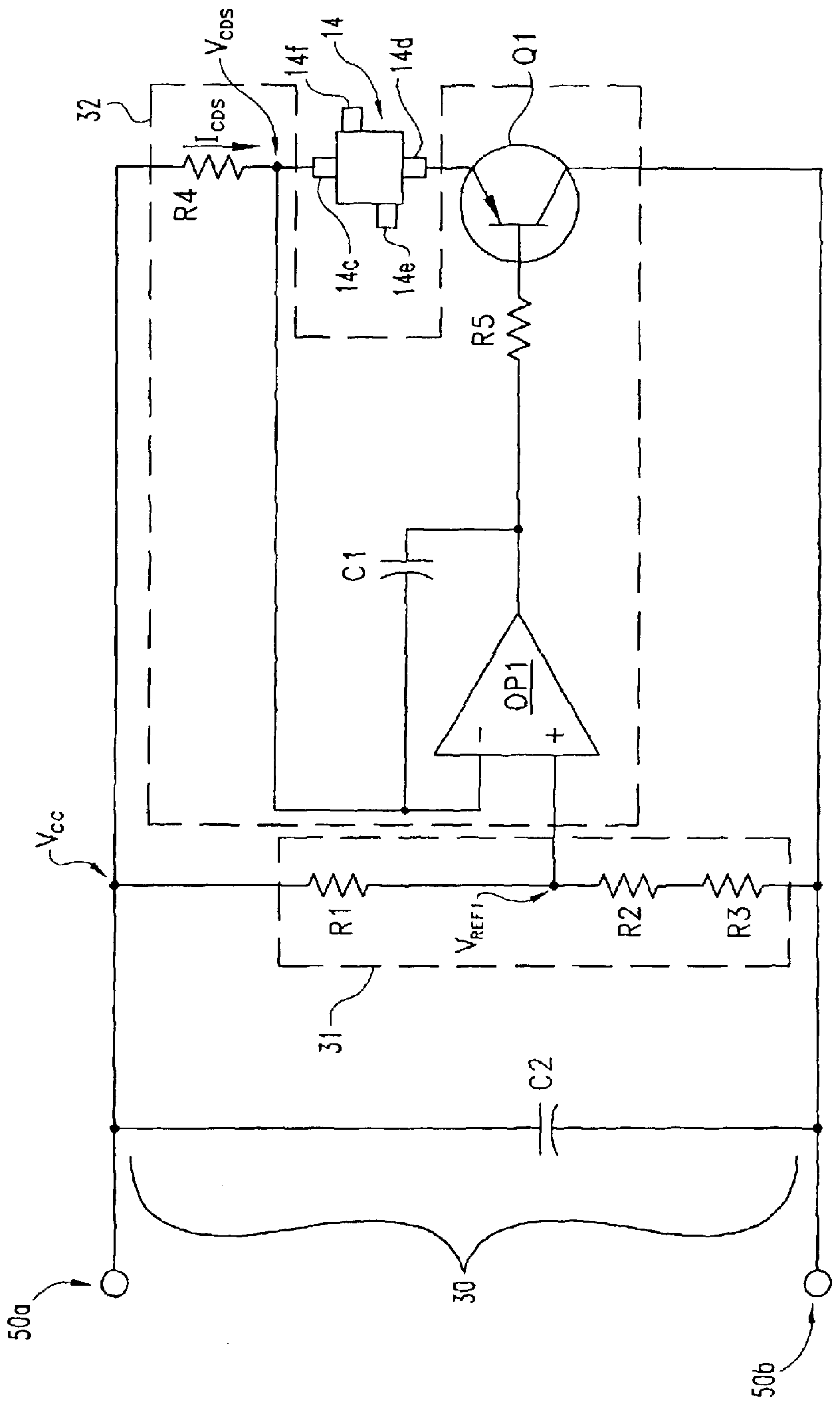
FIG. 4A is a schematic of a preferred embodiment of a drive circuit in accordance with the present invention.

Referring to FIG. 4A, drive circuit 30 comprises a voltage divider 31 operable to generate a first reference voltage signal $V_{REF1}$ in response to a power signal $V_{CC}$. Voltage divider 31 including a first resistor R1, a second resistor R2 and a third-resistor R3 electrically coupled in series to a power supply terminal 50*a* and a ground reference terminal 50*b* of a power source (not shown). Preferably, the power source transmits a power signal $V_{CC}$ of 5.0 volts and first reference voltage signal $V_{REF1}$ is approximately 2.5 volts. The present invention contemplates that resistors R1 and R2 are of equal value and that resistor R3 is of a significantly less value. Preferably, resistors R1 and R2 are 10 k ohm resistors, and resistor R3 is a trimable 1 k ohm resistor.

Drive circuit 30 further comprises a current amplifier 32 operable to generate and control constant current drive signal $I_{CDS}$ and constant voltage drive signal $V_{CDS}$ in response to power signal $V_{CC}$ and a generated first reference voltage signal $V_{REF1}$. Current amplifier 32 includes a first operational amplifier OP1, a first bipolar pnp transistor Q1, a fourth resistor R4, a fifth resistor R5, and a first capacitor C1. Operational amplifier OP1 has a non-inverting input electrically coupled to voltage divider 31 to receive a generated reference voltage signal $V_{REF1}$, and an inverting input electrically coupled to input lead 14*c* of Hall effect device 14. Transistor Q1 has an emitter lead electrically coupled to reference lead 14*d* of Hall effect device 14 and a collector lead electrically coupled to ground reference terminal 50*b*. Resistor R4 electrically couples power supply terminal 50*a* to input lead 14*c* of Hall effect device 14, resistor R5 electrically couples a power output of operational amplifier OP1 to a base lead of transistor Q1, and capacitor C1 electrically couples the power output of operational amplifier OP1 to the inverting input of operational amplifier OP1. Preferably, constant current drive signal $I_{CDS}$ is 7.0 milliamperes ±10 microamperes and constant voltage drive signal $V_{CDS}$ is approximately 4.2 volts. Accordingly, it is preferred that resistor R4 is a 150 ohm resistor, resistor R5 is a 470 ohm resistor, and capacitor C1 is a 0.01 microfarads capacitor. The present invention further contemplates that drive circuit 30 can further comprise a second capacitor C2 electrically coupling power supply terminal 50*a* and ground reference terminal 50*b* to eliminate any noise from power signal $V_{CC}$. Preferably, capacitor C2 is a 0.1 microfarads capacitor.

Figure 4B:
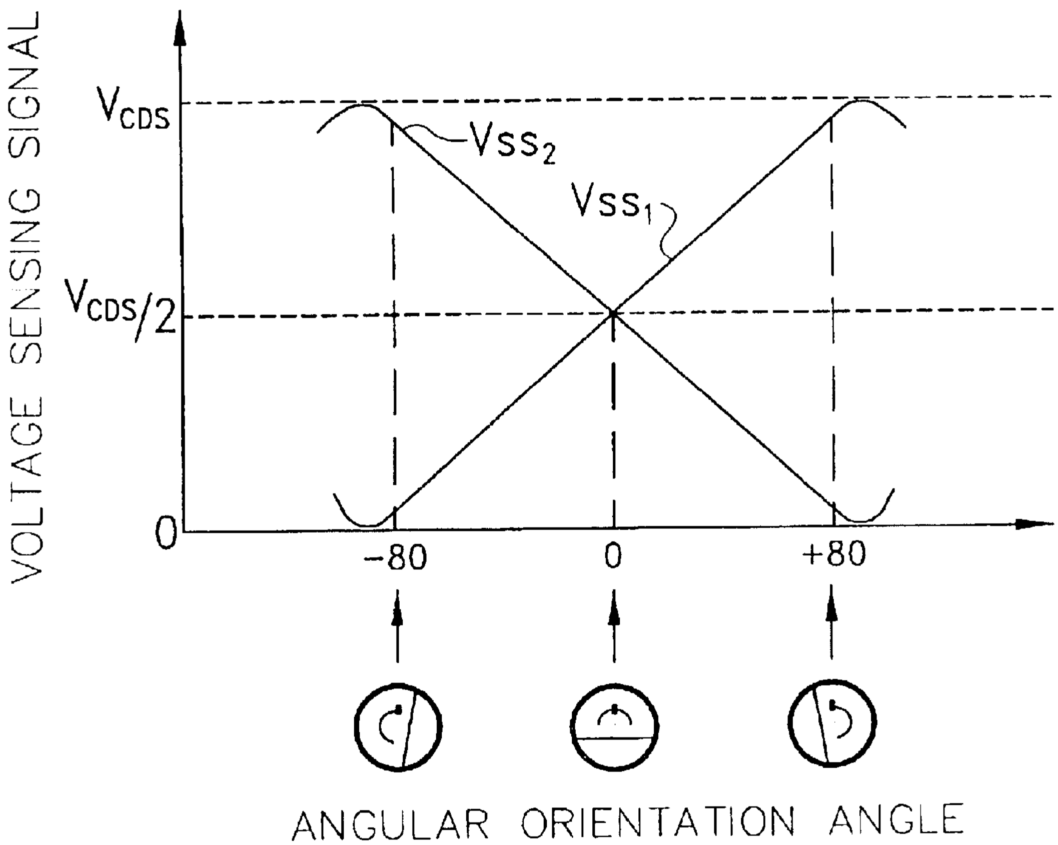
FIG. 4B is a graph depicting a waveform of a first generated voltage sensing signal and a waveform of a second generated voltage sensing signal of a preferred embodiment of the magnetic flux sensor of FIGS. 1A–1D.

Upon receipt of a generated constant current drive signal $I_{CDS}$ and a generated constant voltage drive signal $V_{CDS}$, via input lead 14*c*, Hall effect device 14 generates voltage sensing signals $V_{SS1}$ and $V_{SS2}$. Waveforms of generated voltage sensing signals $V_{SS1}$ and $V_{SS2}$ as related to angular orientation angle θ of Hall effect device 14 relative to magnetic field 15 are shown in FIG. 4B. Referring to FIGS. 2A–2C and 4B, it is to be appreciated and understood that each value of voltage sensing signals $V_{SS1}$, and $V_{SS2}$ along the waveforms exclusively corresponds to a distinct degree of rotation of control shaft 20 about a rotational axis, e.g. longitudinal axis 21 of control shaft 20, over a 180 degree range of rotation. It is to be further appreciated and understood that voltage sensing signals $V_{SS1}$ and $V_{SS2}$ are linearly generated over a middle 160 degrees of the 180 degree range of rotation. Unfortunately, voltage sensing signals $V_{SS1}$ and $V_{SS2}$ are high impedance loads that are not feasible as voltage output signals. Accordingly, a preferred embodiment of an output signal amplifier 40 is shown in FIG. 5.

Figure 5:
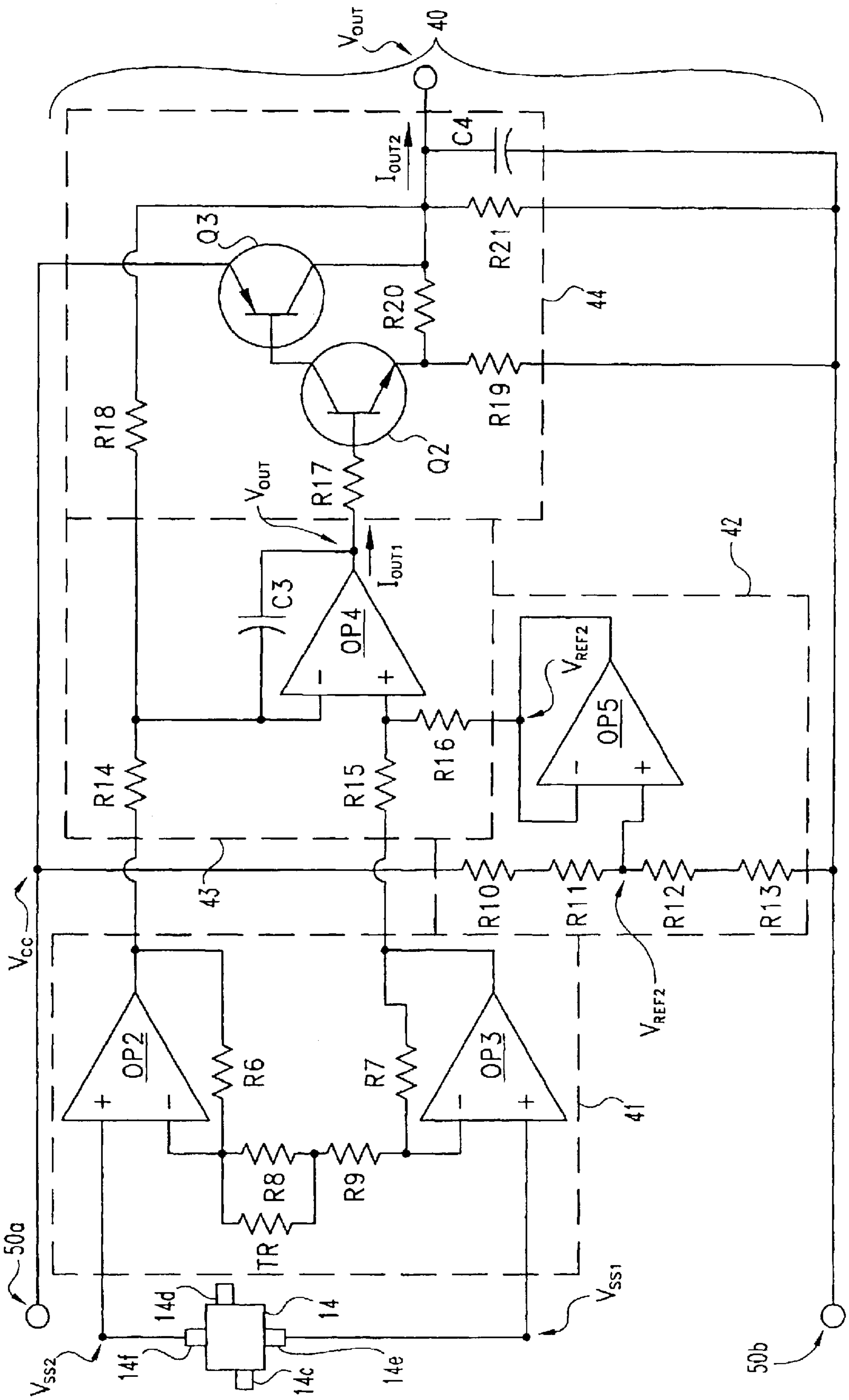
FIG. 5 is a schematic of a preferred embodiment of an output signal amplifier in accordance with the present invention.

Referring to FIG. 5, output signal amplifier 40 comprises a buffer amplifier 41 operable to buffer voltage sensing signals $V_{SS1}$ and $V_{SS2}$ and to counteract any temperature drift of voltage sensing signals $V_{SS1}$ and/or $V_{SS2}$ due to the ambient temperature of Hall effect device 14. Buffer amplifier 41 includes a second operational amplifier OP2, a third operational amplifier OP3, a sixth resistor R6, a seventh resistor R7, an eighth resistor R8, a ninth resistor R9 and a thermistor TR. Operational amplifier OP2 has a non-inverting input electrically coupled to output lead 14*f* of Hall effect device 14 to receive a generated voltage sensing signal $V_{SS1}$, and operational amplifier OP3 has a non-inverting input electrically coupled to output lead 14*e* of Hall effect device 14 to receive a generated voltage sensing signal $V_{SS2}$. Resistor R6 electrically couples a power output of operational amplifier OP2 to an inverting input of operational amplifier OP2, resistor R7 electrically couples a power output of operational amplifier OP3 to an inverting input of operational amplifier OP3, resistors R8 and R9 in series electrically couple the inverting input of operational amplifier OP2 and the inverting input of operational amplifier OP3, and thermistor TR is electrically coupled in parallel to resistor R8. Preferably, resistors R6 and R7 are 10 k ohm resistors, and resistors R8 and R9 are 1 k ohm resistors.

Output signal amplifier 40 further comprises a voltage divider 42 operable to generate a second reference voltage signal $V_{REF2}$ in response to a power signal $V_{CC}$. Second reference voltage signal $V_{REF2}$ is generated to correct for any manufacturing anomalies of Hall effect device 14 as further described in FIG. 6A and accompanying text. Voltage divider 42 includes a tenth resistor R10, an eleventh resistor R11, a twelfth resistor R12, and a thirteenth resistor R13 electrically coupled in series to power supply terminal 50*a* and ground reference terminal 50*b*. Preferably, power signal $V_{CC}$ is 5.0 volts and second reference voltage signal $V_{REF2}$ is approximately 2.5 volts. The present invention contemplates that resistors R10 and R13 are of equal value and that resistors R11 and R12 are of a significantly less value. Preferably, resistors R10 and R13 are 10 k ohm resistors, and resistors R11 and R12 are trimable 1 k ohm resistors. Voltage divider 42 further includes an operational amplifier OP5 having an non-inverting input electrically coupled to resistors R11 and R12 to receive a generated second reference voltage signal $V_{REF2}$, and an inverting input electrically coupled to a power output.

Output signal amplifier 40 further comprises a differential amplifier 43 operable to generate a voltage output signal $V_{OUT}$ and a first current output signal $I_{OUT1}$ in response to buffered voltage sensing signals $V_{SS1}$ and $V_{SS2}$, and a generated second reference voltage signal $V_{REF2}$. Differential amplifier 43 includes an operational amplifier OP4, a fourteenth resistor R14, a fifteenth resistor R15, a sixteenth resistor R16 and a third capacitor C3. Resistor R14 electrically couples the power output of operational amplifier OP2 to an inverting input of operational amplifier OP4, resistor R15 electrically couples the power output of operational amplifier OP3 to a non-inverting input of operational amplifier OP4, resistor R16 electrically couples the power output of operational amplifier OP5 to the non-inverting input of operational amplifier OP4, and capacitor C3 electrically couples a power output of operational amplifier OP4 to the inverting input of operational amplifier OP4. It is to be appreciated that voltage output signal $V_{OUT}$ is representative of each degree of rotation of a control shaft 20 about the first rotational axis. Preferably, voltage output signal $V_{OUT}$ ranges between 0 volts and 5.0 volts over the 180 degree range of rotation of control shaft 20, and linearly ranges between 0.5 volts and 4.5 volts over a middle 160 degrees of the 180 degree range of rotation. Accordingly, it is preferred that resistors R14, R1S and R16 are 10 k ohm resistors, and capacitor C3 is a 0.01 microfarads capacitor.

The present invention contemplates that output signal amplifier 40 can further comprises a boost circuit 44 to transmit voltage output signal $V_{OUT}$ and to boost output current signal $I_{OUT1}$. Boost circuit 44 includes a first bipolar npn transistor Q2, a second bipolar pnp transistor Q3, a seventeenth resistor R17, an eighteenth resistor R18, a nineteenth resistor R19, a twentieth resistor R20, a twenty-first resistor R21, and a fourth capacitor C4. An emitter lead of transistor Q3 is electrically coupled to power supply terminal 50*a*, and a base lead of transistor Q3 is electrically coupled to a collector lead of transistor Q2. Resistor R17 electrically couples the power output of operational amplifier OP4 to a base lead of transistor Q2, resistor R18 electrically couples the inverting input of operational amplifier OP4 to a collector lead of transistor Q3, resistor R19 electrically couples an emitter lead of transistor Q2 to ground reference terminal 50*b*, resistor R20 electrically couples the emitter lead of transistor Q2 to the collector lead of transistor Q3, and resistor 21 and capacitor C4 electrically couple the collector lead of transistor Q3 to ground reference terminal 50*b*. Preferably, a boosted output current signal $I_{OUT2}$ is approximately 5 milliamperes. Accordingly, it is preferred that resistor R17 and R19 are 5.6K ohm resistors, resistor R18 is a 10 k ohm resistor, R20 is a 8.2 k ohm resistor, R21 is a trimable 1 k ohm resistor and capacitor C4 is a 0.1 microfarads capacitor.

Figure 6A:
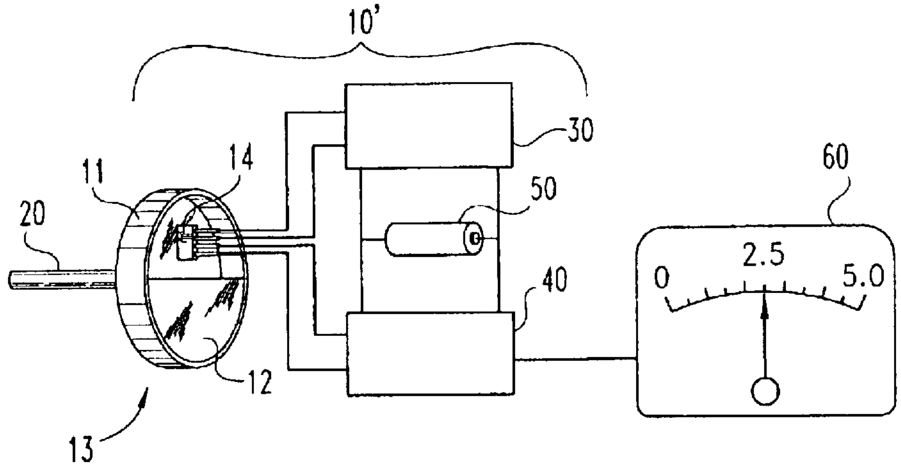
FIG. 6A is a diagrammatic illustration of a reference positioning of a magnetic flux sensor of a preferred embodiment of a magnetic rotational position sensor in accordance with the present invention as adjoined to a control shaft.
Figure 6B:
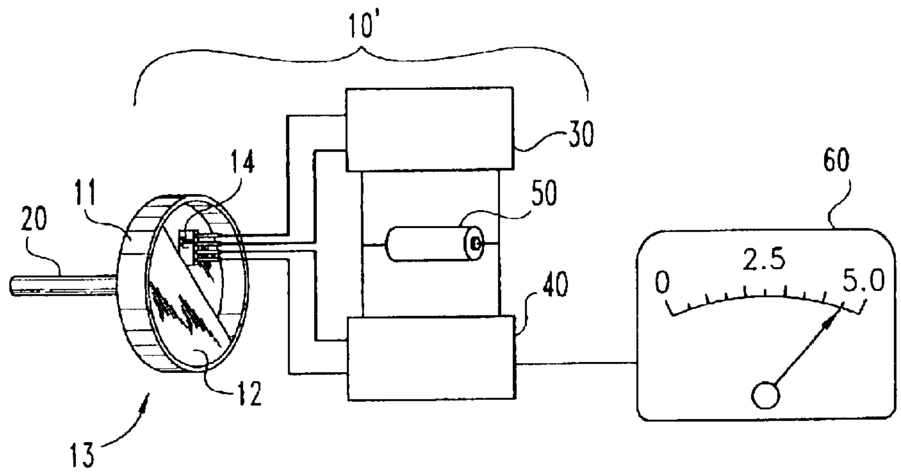
FIG. 6B is a diagrammatic illustration of a clockwise synchronous rotation of a magnetic circuit of the magnetic rotational position sensor of FIG. 6A.
Figure 6C:
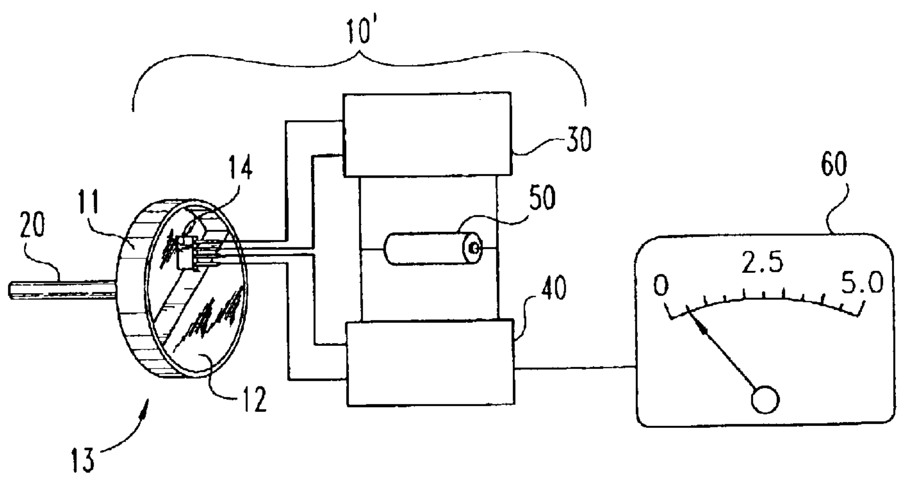
FIG. 6C is a diagrammatic illustration of a counterclockwise synchronous rotation of the magnetic circuit of the magnetic rotational position sensor of FIG. 6A.

Referring to FIGS. 6A–6D, a preferred embodiment of a magnetic rotational position sensor 10' in accordance with the present invention is shown. Magnetic rotational position sensor 10' comprises magnetic circuit 13, Hall effect device 14, drive circuit 30 and output signal amplifier 40 as previously described herein. Magnetic rotational position sensor 10' further comprises a power source 50, e.g. a battery as shown, electrically coupled to drive circuit 30 and output signal amplifier 40 to supply a power signal of 5.0 volts to drive circuit 30 and output signal amplifier 40. The present invention contemplates that at an angular orientation angle θ of zero degrees, voltage sensing signals $V_{SS1}$ and $V_{SS2}$ should be 2.5 volts and output voltage signal $V_{OUT}$ should be 2.5 volts as indicated on a voltmeter 60 as shown in FIG. 6A. It is to be appreciated and understood that Hall effect device 14 can have manufacturing anomalies that offsets voltage sensing signals $V_{SS1}$ and $V_{SS2}$ and output voltage signal $V_{OUT}$ from 2.5 volts. Thus, resistor R3 of drive circuit 30, and resistors R11 and R12 of output signal amplifier 40 are trimmed as necessary to transform the values of voltage sensing signals $V_{SS1}$ and $V_{SS2}$ and output voltage signal $V_{OUT}$ to 2.5 volts. It is to be further appreciated and understood that thermistor TR of output signal amplifier 40 will maintain the value of output voltage signal $V_{OUT}$ to 2.5 volts over a temperature range of approximately –40° Celsius and 150° Celsius. As a result, at an angular orientation angle θ of ±eighty (80) degrees, voltage sensing signals $V_{SS1}$ is 4.5 volts and $V_{SS2}$ is 0.5 volts, and output voltage signal $V_{OUT}$ is 4.5 volts as indicated on voltmeter 60 as shown in FIG. 6B, and at an angular orientation angle θ of eighty (80) degrees, voltage sensing signals $V_{SS1}$ is 0.5 volts and $V_{SS2}$ is 4.5 volts, and output voltage signal $V_{OUT}$ is 0.5 volts as indicated on voltmeter 60 as shown in FIG. 6C. It is to be appreciated and understood that output voltage signal $V_{OUT}$ varies linearly between 0.5 volts and 4.5 volts, and increases and decreases at a rate of 0.025 volts per full degree of rotation of control shaft 20. As a result, output voltage signal $V_{OUT}$ can be easily processed by a microprocessor based system to control all rotational movements of control shaft 20 about the first rotational axis.

Figure 7:
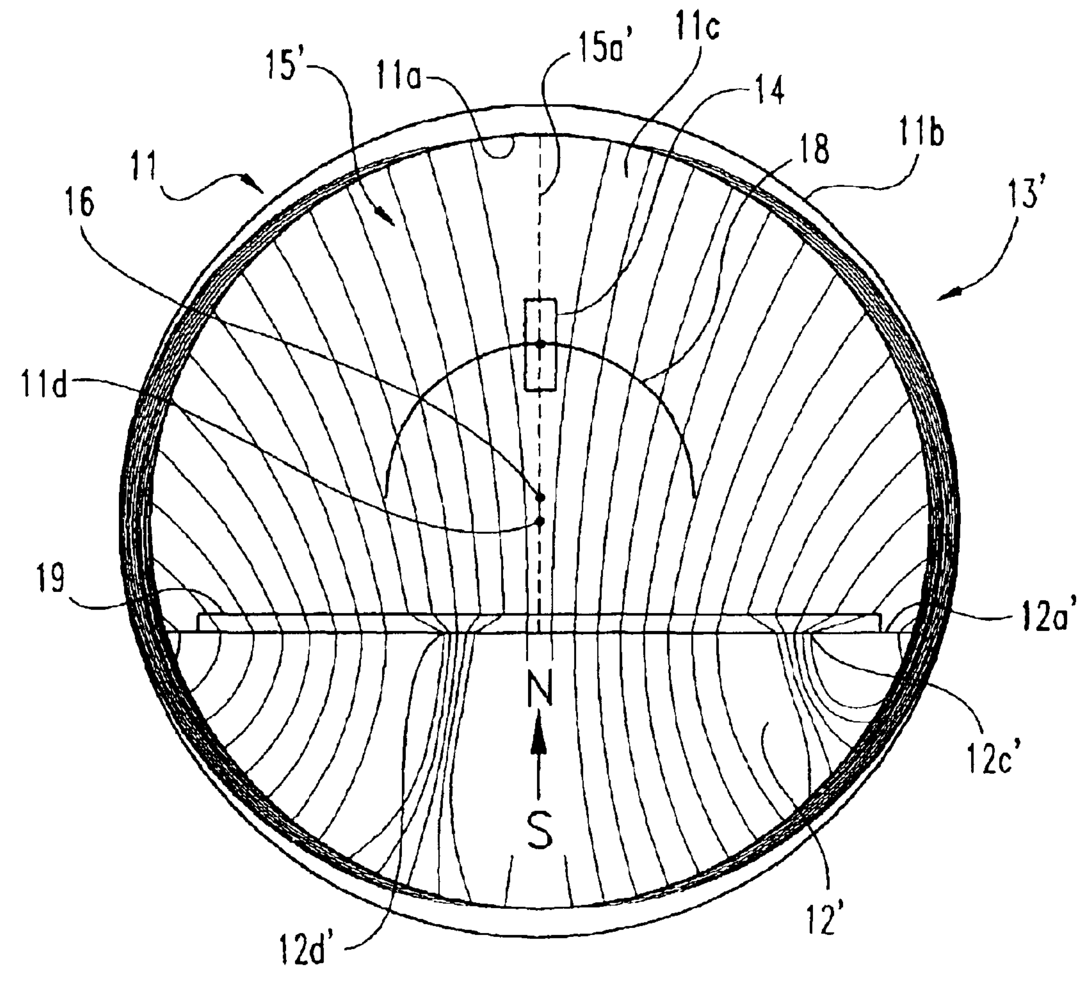
FIG. 7 is a diagrammatic illustration of an alternative embodiment of the magnetic circuit of FIGS. 2A–2C in accordance with the present invention.

As previously described herein in reference to FIGS. 1A–1D and accompanying text, magnetic circuit 13 includes an injection molded rare earth magnet 12 having a substantially semi-circular configuration that is void of any magnetic flux density "hot spots" along both pole surfaces 12*a* and 12*b*. Typically, such magnets are difficult to manufacture. Accordingly, an alternative embodiment of a magnetic circuit 13' in accordance with the present invention is shown in FIG. 7. Referring to FIG. 7, magnetic circuit 13' includes loop pole piece 11 and a magnet 12' of a semi-circular configuration having a first magnetic flux density hot spot 12*c*' and a second magnetic flux density hot spot 12*d*' on a north pole surface 12*a*'. It is to be appreciated and understood that hot spots 12*c*' and 12*d*' hinders an equally balanced magnetic field throughout air gap area 11*c*. Thus, magnetic circuit 13' further includes a diffusion plate 19 adjacent north pole surface 12*a*' of magnet 12' to create and maintain an equally balance magnetic field 15' throughout air gap area 11*c*.

Figure 8:
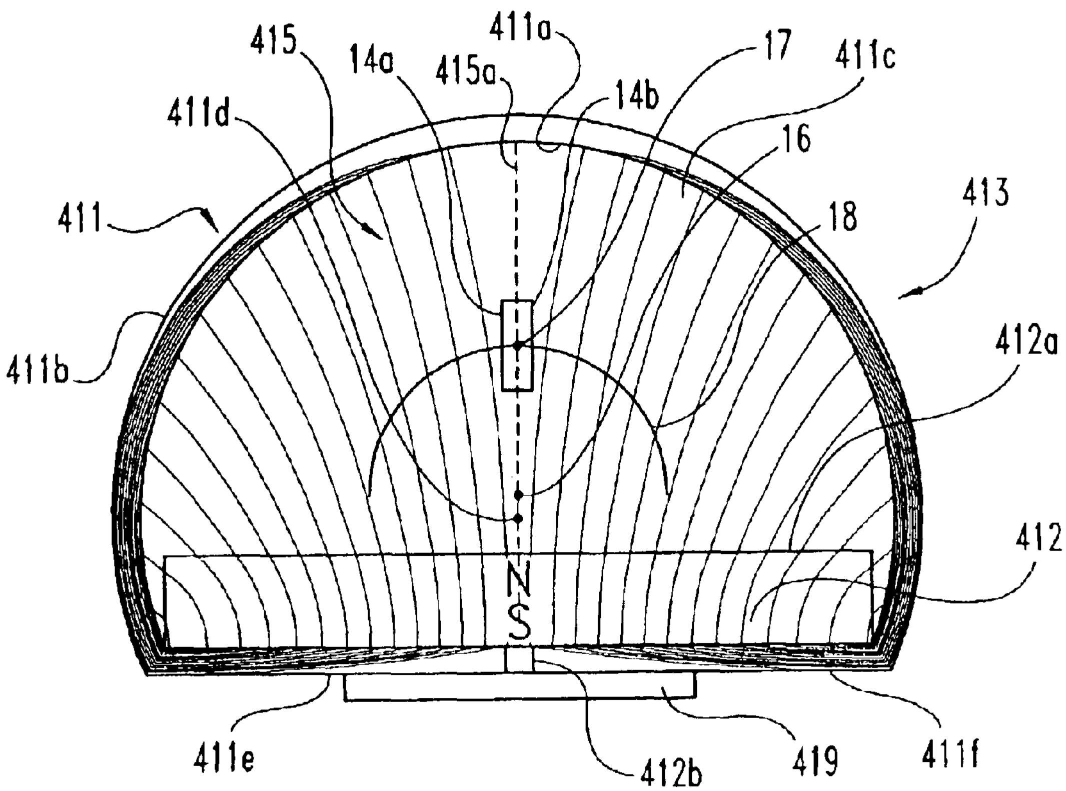
FIG. 8 is a diagrammatic illustration of an alternative embodiment of the magnetic circuit of FIG. 3A in accordance with the present invention.

As defined herein in reference to FIGS. 1A–1D and accompanying text, a loop pole piece can be any combination of manufactured magnetizable articles that has a closed configuration defining an air gap area. FIG. 8 is an example of such a loop pole piece. Referring to FIG. 8, a magnetic circuit 413 includes a first pole piece 411 of an opened dome configuration, and a second pole piece 419 having a rectangular prism configuration adjoined to a portions 411*e* and 41 If of pole piece 411 to close first pole piece 411, thus defining an air gap area 411*c*. Magnetic circuit 413 further includes a magnet 412 disposed within air gap area 411*c* with a north pole surface 412*a* facing and spaced from an inner diameter surface 411*a* of pole piece 411 and a south pole surface adjoined to a portion 411*e* and a portion 411*f* of pole piece 411 to generate a magnetic field 415. Pole piece 419 is properly aligned along portions 411*e* and 411*f* to equally balance enclosed magnetic field 415 throughout air gap area 411*c*.

Figure 9:
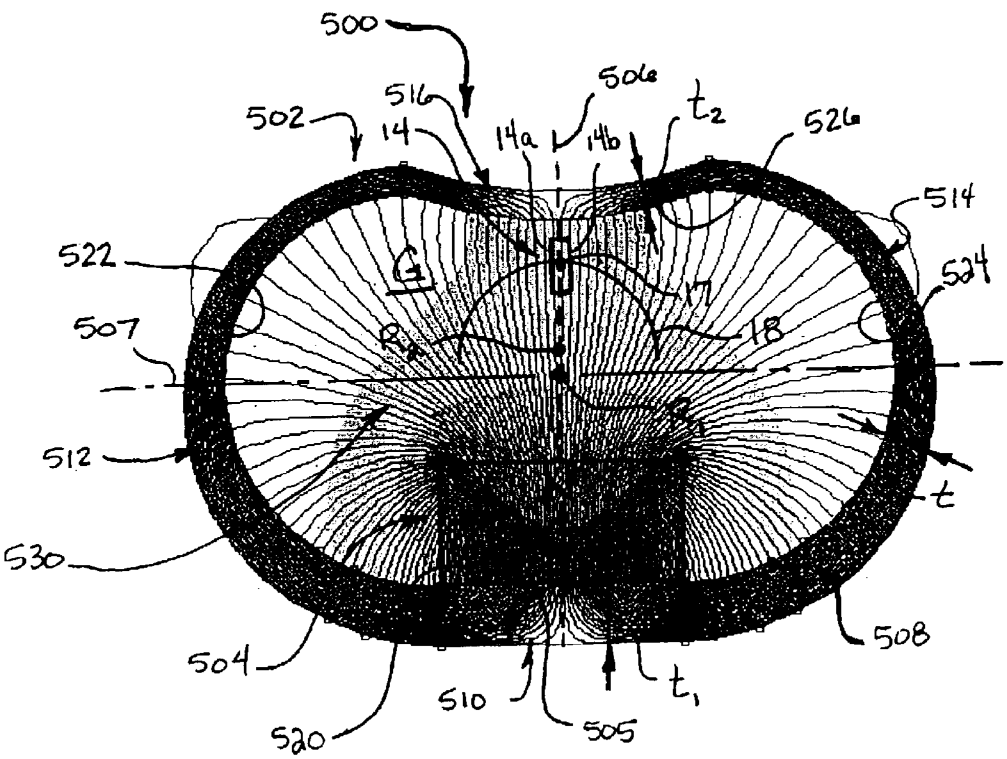
FIG. 9 is a diagrammatic illustration of a magnetic rotational position sensor according to another embodiment of the present invention.

Referring to FIG. 9, shown therein is a magnetic rotational position sensor 500 according to another form of the present invention. The magnetic rotational position sensor 500 includes a magnetic circuit generally comprised of a loop pole piece 502 and a magnet 504 arranged generally along a central axis 506. Similar to the magnetic rotational position sensor embodiments illustrated and described above, the magnetic rotational position sensor 500 is adapted to sense rotation of a control shaft (e.g., control shaft 20) about a rotational axis $R_1$ with minimal magnetic hysteresis. The magnetic rotational position sensor 500 is preferably adapted to sense rotation of a control shaft about the rotational axis $R_1$ over a one-hundred and eighty (180) degree range of rotation. However, other ranges of rotation are also contemplated as falling within the scope of the present invention.

The loop pole piece 502 includes a peripheral outer wall outer wall 508 extending about an inner air gap area G within which the magnet 504 is disposed. The magnet 504 is preferably polarized in a direction extending generally along the central axis 506. However, it should be understood that other polarization configurations are also contemplated as falling within the scope of the present invention. In one embodiment of the invention, the loop pole piece 502 has a closed configuration defined by a continuous, uninterrupted peripheral outer wall 508. However, it should be understood that in other embodiments of the invention, the outer wall 508 may be peripherally interrupted at one or more locations, as illustrated and described in U.S. Pat. No. 6,417,664 to Ventroni et al., the contents of which are hereby incorporated by reference in their entirety.

The loop pole piece 502 has a non-circular or non-diametric configuration. More specifically, the loop pole piece 502 includes a base portion 510 arranged along the central axis 506, a pair of outwardly projecting portions 512 and 514 extending laterally from the base portion 510 and disposed on opposite sides of the central axis 506, and an inwardly projecting portion 516 disposed between the outwardly projecting portions 512, 514 and arranged generally along the central axis 506. The loop pole piece 502 is preferably substantially symmetrical relative to the central axis 506. In the illustrated embodiment of the invention, the loop pole piece 502 has an oblong or elliptical configuration, defining a transverse dimension along a transverse axis 507 that is greater than an axial dimension along the central axis 506. Although the loop pole piece 502 has been illustrated and described as having a specific shape and configuration, it should be understood that other shapes and configurations are also contemplated as falling within the scope of the present invention.

The base portion 510, the outwardly projecting portions 512 and 514, and the inwardly projecting portion 516 cooperate to define the inner air gap G. The magnet 504 is disposed within the air gap G adjacent the base portion 510 of the loop pole piece 502, with the south pole S of the magnet 504 positioned adjacent the base portion 510 and the north pole N of the magnet 504 facing the air gap G. However, it should be understood that the orientation of the magnet 504 may be reversed, with the north pole N disposed adjacent the base portion 510 and the south pole S facing the air gap G. In the illustrated embodiment of the invention, the magnet 504 has a rectangular configuration, with the base portion 510 of the pole piece 502 having a linear configuration defining a substantially flat inner surface 520 for adjoinment with a corresponding flat surface 505 of the magnet 504. However, it should be understood that other configurations of the magnet 504 and the base portion 510 are also contemplated as falling within the scope of the present invention, including non-rectangular and non-linear configurations, examples of which have been illustrated and described above with regard to other embodiments of the invention.

The outwardly projecting portions 512, 514 of the loop pole piece 502 each preferably have an arcuate configuration defining concave inner surfaces 522, 524, respectively, facing the air gap area G. In one embodiment of the invention, the concave inner surfaces 522, 524 each have a diametric configuration defining a substantially uniform radius of curvature. However, other configurations of the outwardly projecting portions 512, 514 are also contemplated as falling within the scope of the present invention, including non-diametric configurations and non-arcuate configurations, such as, for example, angled configurations or polygonal configurations.

The inwardly projecting portion 516 of the loop pole piece 502 preferably has an arcuate configuration defining a convex inner surface 526 facing the air gap area G. In one embodiment of the invention, the convex inner surface 526 defines a substantially uniform radius of curvature. However, other configurations of the inwardly projecting portion 516 are also contemplated as falling within the scope of the present invention, including non-arcuate configurations, such as, for example, angled configurations or polygonal configurations.

In one embodiment of the invention, the outer wall 508 of the pole piece 502 has a varying material thickness t. More specifically, the base portion 510 of the pole piece 502 adjacent the magnet 504 has a first thickness $t_1$ which transitions to a reduced second thickness $t_2$ adjacent the inwardly extending portion 516. In a preferred embodiment of the invention, the pole piece 502 gradually transitions from the first thickness $t_1$ to the second thickness $t_2$ along the length of the outwardly extending portions 512, 514. As should be appreciated, the thicker portions of the loop pole piece 502 offer a lesser degree of magnetic reluctance than do the thinner portions of the loop pole piece 502. As a result, the portions of the loop pole piece 502 conveying higher levels of magnetic flux density are provided with a greater material thickness t compared to the portions of the loop pole piece 502 conveying lower levels of magnetic flux density.

The loop pole piece 502 and the magnet 504 cooperate to generate a magnetic field 530 within the air gap G. Preferably, the magnetic field 530 is equally balanced relative to the central axis 506 so as to define substantially symmetrical portions of the magnetic field 530 on either side of the central axis 506. A magnetic flux sensor 14 is positioned within the air gap G to sense varying magnitudes of magnetic flux density passing through the sensing planes **14*a* and 14*b* upon rotation of the magnetic circuit about a rotational axis $R_2$. In the illustrated embodiment of the invention, a single magnetic flux sensor 14** is provided to sense varying magnitudes of magnetic flux density within the air gap G. However, in other embodiments of the invention, two or more magnetic flux sensors may be used to sense varying magnitudes of magnetic flux density within the air gap G, an example of which is illustrated and described in U.S. Pat. No. 6,472,865 to Tola et al., the contents of which are hereby incorporated by reference in their entirety.

In one embodiment of the invention, the rotational axis $R_2$ of the magnetic circuit is arranged co-axial with the rotational axis $R_1$ of the control shaft. However, in other embodiments of the invention, the rotational axis $R_2$ of the magnetic circuit may be offset from the rotational axis $R_1$ of the control shaft. In a preferred embodiment of the invention, the magnetic flux sensor 14 is arranged along a central axis 17 extending generally along the sensing surfaces **14*a*, 14*b* and offset from and arranged substantially parallel to the rotational axis $R_2$ of the magnetic circuit. As a result, the central axis 17 of the magnetic flux sensor 14 travels along a sensing path 18, extending generally along a radial arc as the magnetic circuit is rotated about the rotational axis $R_2$. As discussed above, the sensing range of the magnetic rotational position sensor 500 preferably extends over a one-hundred and eighty (180) degree range of rotation. Accordingly, the sensing path 18** also preferably extends along a one-hundred and eighty (180) degree radial arc.

Due to the unique configuration of the loop pole piece 502, the relative density or concentration of the magnetic field lines is increased in the region of the air gap G adjacent the central axis 506 extending between the magnet 504 and the inwardly extending pole piece portion 516. Additionally, the magnetic field lines adjacent the central axis 506 extending between the magnet 504 and the inwardly extending pole piece portion 516 are relatively uniform and are arranged substantially parallel with the central axis 506. As a result, sensitivity associated with the positioning and alignment of the magnetic flux sensor 14 within the air gap G adjacent the central axis 506 is reduced, thereby resulting in increased linearity and decreased hysteresis of sensor signal output.

While the present invention has been illustrated and described in detail in the drawings and foregoing description, the same is to be considered as illustrative and not restrictive in character, it being understood that the preferred embodiment has been shown and described and that all changes and modifications that come within the spirit of the invention are desired to be protected.

What is claimed is:

1. A magnetic rotational position sensor, comprising:

a magnetic circuit, including:

a loop pole piece having a peripheral outer wall defining an inner air gap, said outer wall including an inwardly projecting portion extending into said air gap and defining a convex inner surface facing said air gap; and a magnet positioned within said air gap and disposed generally opposite said inwardly projecting portion of said loop pole piece;

wherein said magnet and said loop pole piece cooperate to generate a magnetic field within said air gap extending between said magnet and said convex inner surface of said inwardly projecting portion, said magnetic circuit being rotatable about a rotational axis to correspondingly rotate said magnetic field about said rotational axis; and a magnetic flux sensor disposed within said magnetic field generally between said magnet and said inwardly projecting portion of said loop pole piece to sense a different magnitude of magnetic flux density passing therethrough in response to rotation of said magnetic field about said rotational axis.

2. The magnetic rotational position sensor of claim 1, wherein said magnet has a pole surface facing said inwardly projecting portion of said outer wall.

3. The magnetic rotational position sensor of claim 1, wherein said outer wall of said loop pole piece includes a pair of outwardly extending portions arranged on opposite sides of said inwardly projecting portion.

4. The magnetic rotational position sensor of claim 3, wherein said outwardly projecting portions of said outer wall define concave inner surfaces facing said air gap.

5. The magnetic rotational position sensor of claim 1, wherein said outer wall of said loop pole piece extends continuously about said air gap to define a closed loop configuration.

6. The magnetic rotational position sensor of claim 1, wherein said outer wall of said loop pole piece has a varying thickness.

7. The magnetic rotational position sensor of claim 6, wherein said outer wall of said loop pole piece adjacent said inwardly projecting portion has a first thickness, said outer wall of said loop pole piece adjacent said magnet having a second thickness greater than said first thickness.

8. The magnetic rotational position sensor claim 1, wherein said magnetic flux sensor extends along a central axis that is offset from and arranged substantially parallel to said rotational axis.

9. A magnetic rotational position sensor, comprising:

a magnetic circuit, including:

a loop role piece having a peripheral outer wall defining an inner air gap, said outer wall including an inwardly projecting portion extending into said air gap; and a magnet positioned within said air gap and disposed generally opposite said inwardly projection portion of said loop pole piece;

wherein said magnet and said loop pole piece cooperate to generate a magnetic field within said air gap, said magnetic circuit being rotatable about a rotational axis to correspondingly rotate said magnetic field about said rotational axis; and a magnetic flux sensor disposed within said magnetic field to sense a different magnitude of magnetic flux density passing therethrough in response to rotation of said magnetic field about said rotational axis, said magnetic flux sensor extending along a central axis that is offset from and arranged substantially parallel to said rotational axis.

10. A magnetic rotational position sensor, comprising:

a magnetic circuit, including:

a loop pole piece having a peripheral outer wall defining an inner air gap, said outer wall including a pair of outwardly projecting arcuate portions arranged on opposite sides of a central axis and defining concave inner surfaces, said outer wall including an inwardly projecting arcuate portion arranged generally along said central axis and defining a convex inner surface; and a magnet positioned within said air gap and disposed generally opposite said inwardly projecting portion of said loop pole piece;

wherein said loop pole piece and said magnet cooperate to generate a magnetic field within said air gap extending between said magnet and said convex inner surface of said inwardly projecting arcuate portion, said magnetic circuit being rotatable about a rotational axis to correspondingly rotate said magnetic field about said rotational axis; and a magnetic flux sensor disposed within said magnetic field to sense a different magnitude of magnetic flux density passing theretbrough in response to rotation of said magnetic field about said rotational axis.

11. The magnetic rotational position sensor of claim 10, wherein said outer wall of said loop pole piece has a varying thickness along said outwardly extending portions.

12. The magnetic rotational position sensor of claim 10, wherein said outer wall of said loop pole piece adjacent said inwardly projecting portion has a first thickness, said outer wall of said loop pole piece adjacent said magnet having a second thickness greater than said first thickness.

13. The magnetic rotational position sensor of claim 10, wherein said magnet is polarized in a direction extending generally along said central axis.

14. The magnetic rational position sensor of claim 10, wherein said magnetic flux sensor extends along a central axis that is offset from and arranged substantially parallel to said rotational axis.

15. A magnetic rotational position sensor, comprising:

a magnetic circuit, including:

a loop pole piece defining an inner air gap; and a magnet disposed within said air gap and having a first pole face positioned adjacent said loop pole piece and a second pole face facing said inner air gap;

wherein said loop pole piece and said magnet cooperate to generate a magnetic field within said air gap, said magnetic circuit being rotatable about a rotational axis to correspondingly rotate said magnetic field about said rotational axis; and a magnetic flux sensor including a sensing plane extending along a sensor axis and operable to sense a magnitude of magnetic flux density passing therethrough, said magnetic flux sensor disposed within said magnetic field with said sensor axis offset from and arranged substantially parallel to said rotational axis, said magnetic flux sensor positioned such that an angular orientation of said sensing plane changes relative to said magnetic field in response to rotation of said magnetic field about said rotational axis to sense a different magnitude of magnetic flux density.

16. The magnetic rotational position sensor of claim 15, wherein said sensor axis of said magnetic flux sensor is relatively displaced along a radial arc during said rotation of said magnetic field.

17. The magnetic rotational position sensor of claim 16, wherein said radial arc extends about said rotational axis.

18. The magnetic rotational position sensor of claim 16, wherein said radial arc extends approximately 180 degrees.

19. A magnetic rotational position sensor, comprising:

a magnetic circuit, including:

a loop pole piece defining an inner air gap; and a magnet disposed within said air gap; and wherein said loop pole piece and said magnet cooperating to generate a magnetic field within said air gap, said magnetic circuit being rotatable about a rotational axis to correspondingly rotate said magnetic field about said rotational axis; and a first magnetic flux sensor extending along a sensor axis and operable to sense a magnitude of magnetic flux density passing therethrough, said magnetic flux sensor disposed within said magnetic field with said sensor axis offset from and arranged substantially parallel to said rotational axis to sense a different magnitude of magnetic flux density in response to rotation of said magnetic field about said rotational axis; and a second magnetic flux sensor extending along said sensor axis and being operable to sense a different magnitude of magnetic flux density in response to said rotation of said magnetic field about said rotational axis.

20. A magnetic rotational position sensor, comprising:

a magnetic circuit, including:

a loop pole piece defining an inner air gap; and a magnet disposed within said air gap; and wherein said loop pole piece has a peripheral outer wall defining said air gap, said outer wall including a pair of outwardly projecting arcuate portions arranged on opposite sides of a central axis and defining concave inner surfaces, said outer wall including an inwardly projecting arcuate portion arranged generally along said central axis and defining a convex inner surface facing said air gap, said magnet disposed generally opposite said inwardly projecting portion of said loop pole piece, said loop pole piece and said magnet cooperating to generate a magnetic field within said air gap, said magnetic circuit being rotatable about a rotational axis to correspondingly rotate said magnetic field about said rotational axis; and a magnetic flux sensor extending along a sensor axis and operable to sense a magnitude of magnetic flux density passing therethrough, said magnetic flux sensor disposed within said magnetic field with said central axis offset from and arranged substantially parallel to said rotational axis to sense a different magnitude of magnetic flux density in response to rotation of said magnetic field about said rotational axis.

21. A magnetic rotational position sensor, comprising:

a magnetic circuit, including:

a loop pole piece having an inner surface defining an air gap; and a magnet; and wherein said loop pole piece and said magnet cooperate to generate a magnetic field within said air gap extending between a pole face of said magnet and said inner surface of said loop pole piece, said magnetic circuit being rotatable about a rotational axis to correspondingly rotate said magnetic field about said rotational axis; and a magnetic flux sensor extending along a sensor axis and operable to sense a magnitude of magnetic flux density passing therethrough, said magnetic flux sensor disposed within said air gap between said pole face of said magnet and said inner surface of said loop pole piece with said central axis offset from and arranged substantially parallel to said rotational axis to sense a different magnitude of magnetic flux density.

22. The magnetic rotational position sensor of claim 21, wherein said magnetic flux sensor includes a sensing plane extending along said sensor axis, said magnetic flux sensor positioned such that an angular orientation of said sensing plane changes relative to said magnetic field in response to said rotation of said magnetic field about said rotational axis.

23. The magnetic rotational position sensor of claim 21, further comprising a second magnetic flux sensor extending along said sensor axis and being operable to sense a different magnitude of magnetic flux density in response to said rotation of said magnetic field about said rotational axis.

* * * * *